June 20, 1967 D. J. HALE 3,327,259

VHF TUNER FOR TELEVISION RECEIVER

Filed March 30, 1965

INVENTOR:
DAVID J. HALE,

BY *William S Wolfe*
HIS ATTORNEY.

United States Patent Office 3,327,259

Patented June 20, 1967

3,327,259

VHF TUNER FOR TELEVISION RECEIVER

David J. Hale, Fond du Lac, Wis., assignor to General Electric Company, a corporation of New York Filed Mar. 30, 1965, Ser. No. 443,797
3 Claims. (Cl. 334—50)

The present invention relates to television receivers and more specifically toward VHF tuners for such receivers.

The turret type tuner finds widespread application in television receivers. Such a tuner comprises a rotatable turret including thirteen circularly arrayed tuner strips, one tuner strip being provided for each VHF channel and one for UHF operation. Each tuner strip includes a plurality of tuning coils positioned thereon and further includes a plurality of contacts associated with the tuning coils and extending outwardly of the array. The turret is rotatably positioned within the chassis in such a manner as to allow selective indexing of each of the tuner strips to an operating position for selection of a desired channel.

A plurality of spring contact members are utilized to make electrical connection with the contacts of the selected tuner strip. The spring contacts utilized in this manner must meet certain rather demanding requirements in order to insure proper electrical operation and to prevent adverse detuning effects. In this regard, each spring contact must be biased against the associated contact on the selected tuner strip with a relatively large force to achieve accurate and repeatable positioning. In a somewhat similar manner, a relatively large contact force is necessary to insure penetration of any oxide films which form on the contacts and which might otherwise result in detuning. In the absence of such a high contact force relatively expensive contact materials must be employed to prevent the formation of such films.

In the relatively large tuners of this type employed in the prior art a simple cantilever spring contact arrangement was sufficient to provide the requisite contact force. Thus, spring contacts could be employed which were fixed at only one end but which were large enough to provide the requisite contact force without exceeding stress limits. However, the prior art spring contact arrangement is completely unsuitable for present miniaturized tuners. Thus, it is impractical if not impossible within the size limitations imposed in miniaturized tuners to provide a simple cantilever spring contact arrangement which would provide the requisite contact force without increasing stress in the spring contact to the point where failure occurs.

The present invention overcomes this problem through the use of a specially shaped spring contact member to provide the requisite contact force.

Thus, an object of the invention is to provide an improved VHF tuner.

Another object is to provide an improved spring contact arrangement for a miniaturized VHF tuner.

Yet, another object is to provide a VHF tuner including a miniaturized spring contact which provides a relatively large contact force.

These and other objects are achieved in one embodiment of the invention through the use of a spring contact member comprising a spring metal strip having an intermediate arcuate portion. One end of the strip is affixed to an insulative stator block assembled to the bottom of the tuner chassis. The other end of the strip slideably engages the stator block whereas the arcuate portion of the strip abuts the associated contact of the selected tuner strip. In this manner the arcuate portion of the strip is urged against the associated contact with the necessary contact force without exceeding stress limits even though a relatively small strip is employed.

The novel and distinctive features of the invention are set forth in the appended claims. The invention itself, together with further objects and advantages thereof, may best be understood by reference to the following description and accompanying drawings in which:

Figures 1, 2, 3:
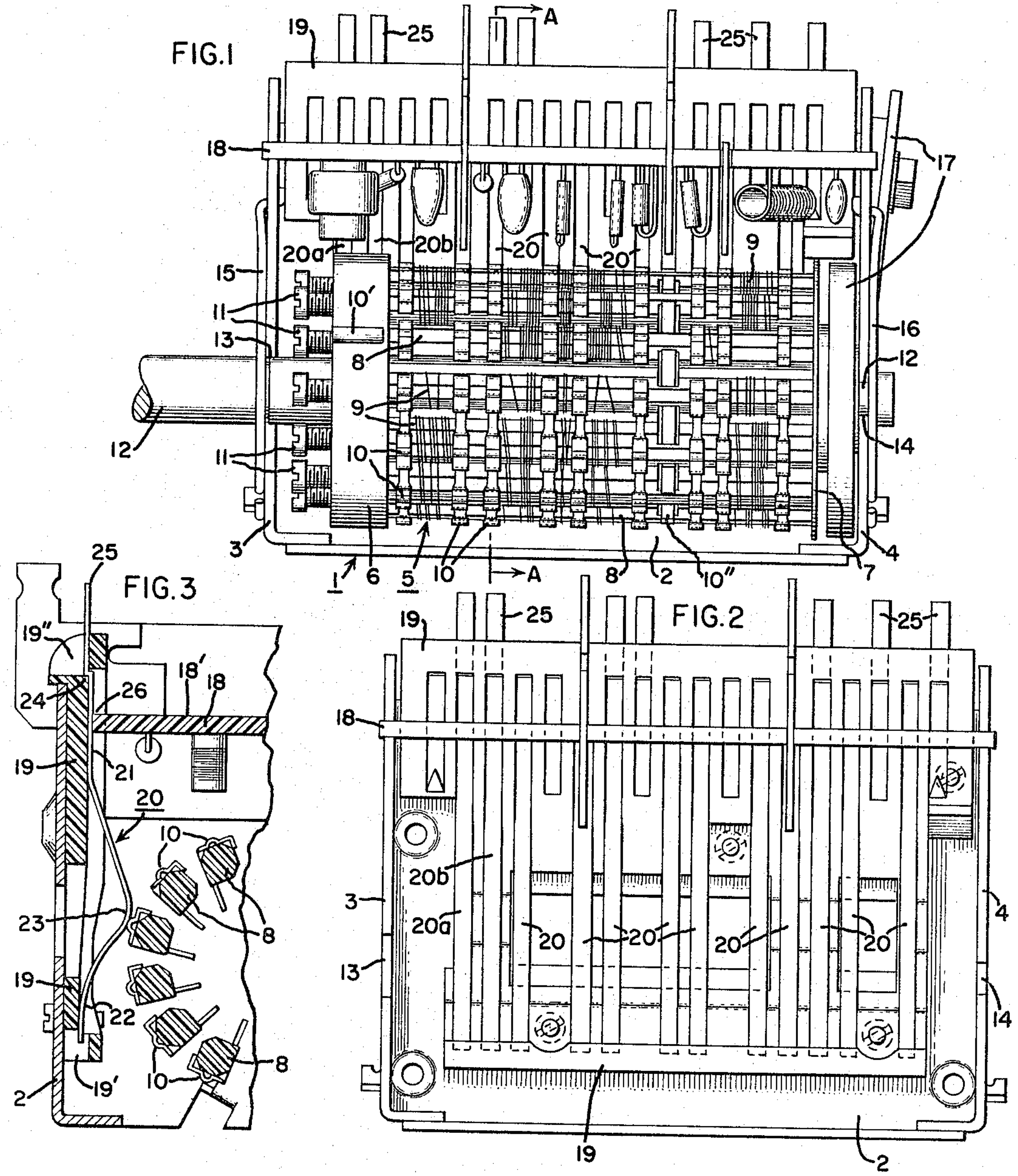
FIGURE 1 is a top view of a miniature turret tuner in accordance with the invention.
FIGURE 2 is a view similar to FIGURE 1 with the turret assembly removed.
FIGURE 3 is a partial sectional view taken along the line A—A of FIGURE 1.

Referring to FIGURE 1 there is shown a VHF tuner employing the miniaturized spring contacts of the invention. The tuner comprises a metal chassis generally shown at 1 including a bottom portion 2 and first and second end wall portions 3 and 4. A turret assembly generally shown at 5 is rotatably positioned between the side walls 3 and 4. The turret assembly 5 comprises first and second circular end support members 6 and 7 between which are carried a plurality of tuner strips 8. Thirteen such tuner strips are circularly arrayed between the end support members 6 and 7, one tuner strip being provided for each VHF channel and one for UHF operation.

Each tuner strip 8 is provided with a plurality of coils 9 which perform the desired tuning operation when a particular channel is selected. Each tuner strip 8 further includes a plurality of contacts 10 extending outwardly of the array and being electrically connected to the associated coils 9. As depicted, each tuner strip includes the same number of contacts 10. In this instance nine such contacts are employed, the contacts for each strip being aligned with corresponding contacts of the remaining strips. In addition the support member 6 includes a contact 10′ which comes into operation when the UHF tuner strip is selected. Further, a common grounding contact 10″ is provided. Threaded tuning slugs 11 are provided for the various tuner strips 8 to allow tuning of the strips in conventional fashion.

The turret assembly 5 is further provided with a centrally located shaft 12 affixed to the end support members 6 and 7 to rotatably mount the turret assembly to the chassis 1. The shaft 12 is received by slots 13 and 14 in end wall portions 3 and 4 of the chassis respectively. Spring clips 15 and 16 are utilized to maintain the shaft in the desired position.

Thus, the shaft 12 can be rotated to rotate the turret assembly so as to selectively index a desired tuner strip to an operating position. In this manner, a desired channel can be selected. A conventional ball detent system generally shown at 17 is employed to accurately position the selected tuner strip.

A printed circuit board 18 is mounted on the chassis 1, the printed circuit board having printed wiring formed on the outer surface 18′ thereof and having the necessary electrical components such as transistors and resistors mounted thereon. The board 18 is secured to the end wall portions 3 and 4 by any suitable means such as for example soldering.

The tuner is further provided with an insulative stator block 19 to which are mounted in accordance with the invention a plurality of spring contact members 20 as shown more clearly in FIGURES 2 and 3.

Referring to FIGURE 2, the stator block 19 is mounted to the bottom 2 of the chassis through the use of suitable mounting screws as shown. The spring contact members 20 are spaced along the stator block in such a manner that each spring contact excepting spring contacts **20*a* and 20*b* abuts a corresponding contact of the selected tuner strip. The first two spring contact members 20*a* and 20*b* are positioned in such a manner that they are shorted by the terminal 10'** when the UHF tuner strip is selected.

The manner in which the spring contact members 20 abut the associated contacts of the tuner strips 8 is more clearly seen by reference to the sectional view of FIGURE 3. Each spring contact member 20 includes first and second end portions 21 and 22 respectively and an intermediate arcuate portion 23 therebetween. The end 21 of the spring contact member is rigidly affixed to the stator block 19 whereas the end 22 although supported by the stator block 19 is slideable thereon. The spring contact member is further provided with a transverse portion 24 which engages the stator block 19 in order to rigidly mount the spring contact to the stator block.

For a particular spring contact member 20 the end 21 may be extended outwardly of the tuner structure to provide an extending terminal portion 25 to which external connection can be made.

One edge of the stator block 19 as shown in FIGURE 3 is provided with an upwardly extending slot 19' for each spring contact member 20, the slot 19' receiving the associated spring contact member 20 in order to restrain the end 22 of the contact member while still permitting free sliding thereof. Somewhat similarly the opposite edge of the stator block 19 is provided with an upwardly extending slot 19'' for each spring contact member 20, the slot 19'' receiving the associated spring contact member 20 in such a manner that the transverse portion 24 engages the stator block 19 to add mechanical strength to the assembly.

Electrical connection is effected between the printed circuit elements of the board 18 and the end portion 21 of the spring contact members 20 by a suitable solder connection at the junction 26 between the board 18 and the spring contact member 20. In this manner, the coils of a selected tuner strip are electrically connected to the circuitry of the printed circuit board to thereby select a desired channel.

Through the use of a stator block having slotted edges as described, the spring contact members 20 can be mounted merely by inserting the strips in the associated slots 19' and 19'' and then sandwiching the strips between the stator block 19 and the printed circuit board 18, the solder connections at junctions 26 providing further rigidity.

Figure 4:
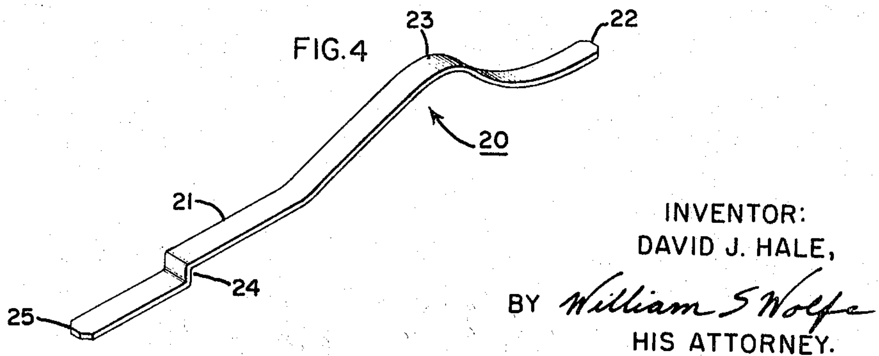
FIGURE 4 is a perspective view of a representative miniature spring contact in accordance with the invention.

Referring to FIGURE 4 there is shown a perspective view of a spring contact member in accordance with the invention. Although in FIGURES 3 and 4 the spring contact member 20 has been shown having an extending terminal portion 25, the portion 25 need not be provided for all of the spring contact members 20. Thus, the terminal portion 25 need only be provided for those spring contact members 20 to which external connection must be made, the remaining spring contact members merely being connected to the appropriate printed circuitry on the board 18.

Through the use of a spring contact member 20 having a shape in accordance with the invention, the requirements of relatively high contact force are satisfied even though size limitations dictate the use of a relatively narrow spring contact having a thin cross-section. Since the end 22 of the spring contact member 20 is supported by the stator block 19 as shown in FIGURE 3 the contact force requirements set forth above are easily met without exceeding stress limitations of the spring contact member. By contrast, if only a simple cantilever arrangement were employed in spring contact member having general dimensions similar to that of the spring contact member 20, the contact force requirements could not readily be met without exceeding the stress limitations.

Although the invention has been described with respect to certain specific embodiments it will be appreciated that modifications and changes may be made by those skilled in the art without departing from the true spirit and scope of the invention.

Wha I claim and desire to secure by Letters Patent of the United States is:

1. A VHF tuner for a television receiver, said tuner comprising;
   - (a) a chassis including first and second generally parallel end wall portions and a transverse bottom portion,
   - (b) a rotatable turret including a plurality of circularly arrayed tuner strips, each strip including a plurality of coils thereon and having a plurality of associated contacts extending outwardly of said array,
   - (c) said turret being carried between said end wall portions and being rotatable about an axis through the center of said array to selectively index one of said tuner strips to an operating position,
   - (d) insulative stator block means affixed to said bottom portion of said chassis,
   - (e) a plurality of spaced spring contact members assembled to said stator block,
   - (f) each spring contact member comprising a spring metal strip having an intermediate arcuate portion, a first end portion of said strip being affixed to said stator block, the second end portion of said strip slideably engaged by said stator block in captive relationship therewith and the arcuate portion of each of said strips extending inward toward and abutting the associated contact of the selected tuner strip.
2. The tuner defined in claim 1 wherein:
   - (a) said spring contact member is provided with a transverse portion between said first end portion and said arcuate portion, and
   - (b) said transverse portion engages an inwardly extending edge of said stator block.
3. The tuner defined in claim 2 wherein:
   - (a) said stator block is provided with a plurality of aligned upwardly extending slots along opposing edges of said block,
   - (b) each slot along the one edge of said block receiving the first end portion of one of said spring contact members, and
   - (c) the corresponding slot of the opposing edge of said block receiving the second end portion of said spring contact member.

References Cited

UNITED STATES PATENTS

| | | | |
|---|---|---|---|
| 2,774,880 | 12/1956 | Fulmer | 336—142 |
| 3,002,060 | 9/1961 | Laviana | 200—166 |
| 3,018,353 | 1/1962 | Mitchell | 200—166.1 |
| 3,083,339 | 3/1963 | Bell | 334—50 X |
| 3,196,225 | 7/1965 | Dennee | 200—166.1 |
| 3,199,357 | 8/1965 | Richie et al. | 334—51 X |
| 3,210,700 | 10/1965 | Krepps, et al. | 334—50 |
| 3,240,898 | 3/1966 | Fischer | 200—166.1 |

HERMAN KARL SAALBACH, *Primary Examiner.*

R. HUNT, *Assistant Examiner.*